United States Patent [19]

Yamaguchi et al.

[11] Patent Number: 5,240,991
[45] Date of Patent: Aug. 31, 1993

[54] POLYISOCYANATE COMPOSITION

[75] Inventors: Shigeru Yamaguchi, Hatano; Hiroaki Katano, Yokohama, both of Japan

[73] Assignee: Dow Mitsubishi Kasei Limited, Tokyo, Japan

[21] Appl. No.: 975,365

[22] Filed: Nov. 12, 1992

Related U.S. Application Data

[63] Continuation of Ser. No. 883,318, May 14, 1992, abandoned.

[51] Int. Cl.$^5$ .............................................. C08L 75/04
[52] U.S. Cl. ...................................... 524/730; 528/48; 528/59; 528/67; 252/182.14; 252/182.21; 252/182.22; 560/331
[58] Field of Search .............................. 528/59, 67, 48; 252/182.14, 182.21, 182.22; 560/331; 524/730

[56] References Cited

U.S. PATENT DOCUMENTS 4,332,742  6/1982  Allen .................... 260/453

FOREIGN PATENT DOCUMENTS 59-16866  2/1984  Japan .
61-69824  4/1986  Japan .
2-145557  8/1990  Japan .

*Primary Examiner*—Maurice J. Welsh

[57] ABSTRACT

This invention relates to a polyisocyanate composition which contains a specific amount of denatured silicon oil being inactive to polyisocyanate compound comprising a specific diphenylmethane diisocyanate oligomer and/or its derivatives. The polyisocyanate composition of this invention has excellent storage stability at low temperature.

6 Claims, No Drawings

POLYISOCYANATE COMPOSITION

CROSS-REFERENCE TO RELATED APPLICATION

This is a continuation of application Ser. No., 07/883,318 filed May 14, 1992 now abandoned.

BACKGROUND OF THE INVENTION

This invention relates to a polyisocyanate composition having excellent storage stability at lower temperature.

Polyisocyanates such as polymethylene polyphenyl poly-isocyanate ("Polymeric MDI" or "C-MDI") are widely utilized as automotive interior parts like steering wheel and instrument pad, daily necessities like adhesive, heat insulators for electric refrigerator, and other structural heat insulators like outer wall panel, pipe and tank in various fields.

Polymeric MDI and its derivatives are widely utilized in the production of a great deal of polyurethane products. Accordingly, the range for storage conditions of those materials has to be broad in actual uses. However, there is few cases in which the storage conditions at a oil drum or can are strictly controlled. Especially, the storage temperature is not usually controlled in a spot foaming like spray foaming construction. Therefore, in winter time, the material storage temperature often reaches to about $-10°$ C. even in everywhere except severe cold regions. On the other hand, research and development activities for improving storage stability of polymeric MDI containing diphenylmethane diisocyanate "MDI" of more than 40 wt % and its derivatives are being continued. As the results, some polymeric MDI, having viscosity of about 170 cps at 25° C., which have excellent storage stability showing that there is no crystallization even at $-10°$ C., are sold on the market by some isocyanate makers.

However, polymeric MDI, having lower viscosity of less than 160 cps, especially, 55 to 140 cps at 25° C., often contains a large amount of MDI having melting point of 38° C. As the result, there is a problem in storage stability that MDI separates from the polymeric MDI at low temperature like about $-10°$ C.

On the other hand, since the from regulation began in 1990 year, the demand for polymeric MDI having lower viscosity and excellent storage stability at low temperature has been increasing. Foaming makers often give severe requirements to isocyanate makers, regarding polyisocyanates having only good storage stability at low temperature. However, it has never been known until now about additives which are soluble in polymeric MDI which gives the smallest changes of its reactivity and characteristics of resulting polyurethane resins without reducing a large number of isocyanate content "NCO %".

Polymeric MDI usually contains a small amount of insoluble dimer prepared by the bonding between NCO groups. The dimer content in polymeric MDI delicately affects its storage stability at low temperature. Since such dimer is easy to be formed at higher temperature, it is necessary to pay the closest attention to storing these polymeric MDI, and it is eagerly expected that a polyisocyanate having excellent storage stability at lower temperature is developed.

SUMMARY OF THE INVENTION

The inventors researched to improve said prior technical problems. That is, the purpose of this invention is to provide a polyisocyanate composition having excellent storage stability at low temperature.

The inventors discovered that the stated purpose of the invention can easily be achieved by employing a polyisocyanate composition containing a specific amount of a specific denatured silicon oil. In other words, this invention is summarized as a polyisocyanate composition which contains 0.0001 to 4 parts by weight of denatured silicon oil being inactive to polyisocyanate compound, based on 100 parts by weight of the polyisocyanate compound comprising diphenylmethane diisocyanate oligomer containing 40 to 62 wt % diphenylmethane diisocyanate and/or its derivatives.

DETAILED DESCRIPTION OF THE INVENTION

The polyisocyanate compound to be employed in the invention is MDI oligomer containing MDI of from 40 to 62 wt % and/or its derivatives. The MDI content is preferably from 44 wt %, more preferably, 45 wt % up to 55 wt %, more preferably, up to 52 wt %. Some examples of such MDI oligomer are as follows: denatured carbodiimide having carbodiimide bonding introduced by employing well-known phosphorus-based catalyst, denatured isocyanate having uretodion bonding or uretoimine bonding, and denatured polyol, having NCO group in its terminal, prepared by the reaction of a polyisocyanate and a polyol. All polyols for the production of ordinary polyurethanes can be employed as said polyol in the invention. As for said polyisocyanate compound, a single or a mixture thereof can be employed in the invention. Incidentally polymeric MDI is a polymer of said MDI and its NCO content is from 28 to 32 wt % and its viscosity at 25° C. is from 55 to 140 cps.

Silicon oil is known as a fluid substance, "polysiloxane" having linear structure which is prepared by the hydrolysis and the condensation polymerization of dialkyldichloro silane as main component with trialkylmonochloro silane as terminal component.

The denatured silicon oil to be employed in this invention is silicon oil which is prepared by denaturing a part of bondings between silicon and alkyl group in said silicon oil in accordance with various methods. Such denatured silicon oil is inactive to polyisocyanate compound. Some examples of said denatured silicon oil are as follows: polyether-type silicon oil having polyoxyalkylene group in replacement of alkyl group in side chain or terminal of polysiloxane, methylstyryl-type silicon oil having methylstyryl group, alkyl-type silicon oil having other alkyl group except the one originating from polysiloxane, higher fatty acid ester-type silicon oil having higher fatty acid ester group, higher alkoxy-type silicon oil having higher alkoxy group, fluoro-type silicon oil having fluoroalkyl group and etc.

A preferable type to be selected from the stated denatured silicon oils is polyether-type. Polysiloxane-polyoxyalkyleneoxide copolymer prepared by the graft-copolymerization of polysiloxane and polyoxyalkylene polyol in the presence of acid catalyst is exemplified as representative example of this polyether-type silicon oil. Preferable polyoxyalkylene oxide is polyethylene glycol, polypropylene glycol and etc.. Regarding physical properties, said copolymer has molecular weight (weight average) of at least 1,000, preferably, 3,000 up to 50,000, preferably, up to 30,000 and also has siloxane content of at least 10 wt %, preferably, 20wt % up to 90 wt %, preferably, up to 80 wt %.

Though said denatured silicon oil can be prepared by various well-known method, commercial products can also be employed. Many commercial products relating to the denatured silicon oil are now being provided on the market by some material makers like Shin-Etsu Silicon, Nihon Unica, Toshiba Silicon, Toray Silicon etc.. The commercial products being provided by Shin-Etsu Silicon are as follows:

Polyether-type : KF-351, KF-352, KF-353, KF-615, KF-6011, KF-6004
Methylstyryl-type : KF-410
Alkyl-type : KF-412, KF-413
Higher fatty acid ester-type: KF-910
Higher alkoxy-type: KF-851
Fluoro-type : X-22-819

Besides, silicon-based surfactant being sold on the market as foaming agent for making urethane foams can also be employed as stated denatured silicon oil. The silicon-based surfactant is a polyether-type silicon oil of which degree of denaturalization and degree of polymerization are adequately adjusted to improve function of surfactant. Regarding the silicon-based surfactant, commercial products can also be employed in this invention.

The denatured silicon oil of this invention can uniformly be soluble or dispersive in polyisocyanate. The mixture gives a stable and normal composition. As for mixing proportion of denatured silicon oil and polyisocyanate, denatured silicon oil of at least 0.0001 parts by weight "pbw", preferably, 0.0005 pbw, more preferably, 0.001 pbw up to 4 pbw, preferably, up to 0.5 pbw is employed based on polyisocyanate compound of 100 pbw. when this composition is stored or employed, it is necessary to pay very attention to water. Because insoluble urea adduct is often prepared by the reaction of the composition with atmospheric water.

The following isocyanates and solvents to be soluble in the composition can be employed.

Isocyanates: aliphatic polyisocyanates such as ethylene diisocyanate, 1,6-hexamethylene diisocyanate, cyclic polyisocyanates such as cyclobutane-1, 3-diisocyanate, cyclohexane-1, 3- and -1, 4-diisocyanate, aromatic polyisocyanates such as m-phenylene diisocyanate, 2, 4- and 2,6-tolilene diisocyanate, isophoron diisocyanate, and oligomer thereof, a mixture of oligomer, compounds denatured with carbodiimide, urethane, biulet, isocyanurate etc.

Solvents: carbonate esthers like ethylenecarbonate and propylenecarbonate, phosphoric esthers like silicic acid esther, chloroalkyl phosphate, dimethylmethyl phosphate, polymeric phosphite and brominated phosphate compound, carboxylic esthers like acetyl acid esther, phthalic acid esther and trimerit acid esther, BTX like benzene, toluene, xylene and chlorinated, nitrated or holonated BTX, other esthers like cellosolve, fron, halon and chlorinated alkane, other ethers, and other aromatic or aliphatic solvents

EXAMPLES AND COMPARATIVE EXAMPLES

The present invention is explained more specifically in the following actual and comparative examples. It is to be understood, however, that the present invention is not to be limited by the embodiment described with respect to the following actual examples. Incidentally, regarding example number, the term "AE" or "CE" in each Table means "Actual Example" or "Comparative Example" respectively.

EXAMPLES 1 TO 22 AND COMPARATIVE EXAMPLES 1 TO 33

Various polyisocyanate compositions were prepared by mixing various polyisocyanate compound shown in Table 1, 2 and 3 with various additives such as denatured silicon oil. The results of evaluation are also shown in each Table.

The MDI content was determined by employing High Speed Gel Permeation Chromaography "HLC-8020" (produced by Tohso). The dimer content was determined by employing Infrared Spectroscopy "IR-700" (produced by Nihon Bunkou). The viscosity was measured under 25° C. by employing Rotational Viscometer "E-type" (produced by Tokyo Keiki).

The additives employed in the actual and comparative examples are as follows. The amount of additive added is represented with "pbw" to polyisocyanate of 100 pbw.

L-720 : denatured siliconoil (polyether-type, produced by Nihon Unica)
Xylene: special grade (produced by Kanto Chemical)
CLP : trischloroethyl phosphate (produced by Wako Junyaku)
L-5340: silicon-based surfactant (produced by Nihon Unica)

The solubility test was evaluated by visual observation. The meaning of each sign shown as "A", "B" or "C" in each Table is as follows. Incidentally, a case wherein urea adduct was prepared by the reaction of polyisocyanate with atmospheric water was evaluated as "A", and a case wherein denatured silicon oil was separated from polyisocyanate was evaluated as "C".

A: soluble
B: dispersive
C: separative

The storage stability at low temperature was evaluated under the condition of 2 or 4 weeks at −10° C. by visual observation. The meaning of each sign shown as "A", "B" or "C" in each Table is as follows.

A: stable (no change)
B: no deposition of crystal but muddy
C: deposition of crystal

EXAMPLES 23 TO 66

Various polyisocyanate compositions were prepared by mixing various denatured silicon oil shown in Table 4 and Table 5 with polyisocyanate compound (MDI content: 48.3 wt %) employed in comparative example 4. The results of evaluation are shown in Table 4 and Table 5.

EXAMPLES 67 TO 72

Various polyisocyanate compositions were prepared by mixing 0.1 wt % of various denatured silicon oil shown in Table 6 with polyisocyanate compound (MDI content: 49.5 wt %) employed in comparative example 20. The results of evaluation are shown in Table 6.

TABLE 1

| NO. | Polyisocyante MDI (wt %) | Dimer (wt %) | Visco. (cps) | Additive Grade | Amount (pbw) | Solubility Test | Storage Stability 2W | 4W |
|---|---|---|---|---|---|---|---|---|
| CE 1 | 42.6 | 0.7 | 178 | — | — | — | A | B |
| AE 1 | 42.6 | 0.7 | 178 | L-720 | 0.5 | A | A | A |
| CE 2 | 45.9 | 0.7 | 138 | — | — | — | C | C |
| AE 2 | 45.9 | 0.7 | 138 | L-720 | 0.5 | A | A | A |
| CE 3 | 47.2 | 0.7 | 129 | — | — | — | C | C |
| AE 3 | 47.2 | 0.7 | 129 | L-720 | 0.5 | A | A | A |
| CE 4 | 48.3 | 0.7 | 119 | — | — | — | C | C |
| CE 5 | 48.3 | 0.7 | 119 | xylene | 2.0 | A | C | C |
| CE 6 | 48.3 | 0.7 | 119 | CLP | 2.0 | A | C | C |
| AE 4 | 48.3 | 0.7 | 119 | L-720 | 0.5 | A | A | A |
| CE 7 | 49.5 | 0.7 | 109 | — | — | — | C | C |
| AE 5 | 49.5 | 0.7 | 109 | L-720 | 0.5 | A | A | A |
| CE 8 | 51.8 | 0.7 | 92 | — | — | — | C | C |
| AE 6 | 51.8 | 0.7 | 92 | L-720 | 0.5 | A | A | A |
| CE 9 | 54.1 | 0.7 | 78 | — | — | — | C | C |
| AE 7 | 54.1 | 0.7 | 78 | L-720 | 0.5 | A | A | A |
| CE 10 | 57.0 | 0.7 | 65 | — | — | — | C | C |
| AE 8 | 57.0 | 0.7 | 65 | L-720 | 0.5 | A | A | A |
| CE 11 | 59.8 | 0.7 | 55 | — | — | — | C | C |
| AE 9 | 59.8 | 0.7 | 55 | L-720 | 0.5 | A | A | A |
| CE 12 | 61.8 | 0.7 | 50 | — | — | — | C | C |
| AE 10 | 61.8 | 0.7 | 50 | L-720 | 0.5 | A | A | B |
| CE 13 | 62.7 | 0.7 | 47 | — | — | — | C | C |
| CE 14 | 62.7 | 0.7 | 47 | L-720 | 0.5 | A | B | C |

TABLE 2

| NO. | Polyisocyante MDI (wt %) | Dimer (wt %) | Visco. (cps) | Additive Grade | Amount (pbw) | Solubility Test | Storage Stability 2W | 4W |
|---|---|---|---|---|---|---|---|---|
| CE 15 | 42.6 | 0.7 | 178 | — | — | — | A | B |
| AE 11 | 42.6 | 0.7 | 178 | L-5340 | 0.5 | A | A | A |
| CE 16 | 46.0 | 0.7 | 138 | — | — | — | C | C |
| AE 12 | 46.0 | 0.7 | 138 | L-5340 | 0.5 | A | A | A |
| CE 17 | 48.3 | 0.7 | 119 | — | — | — | C | C |
| CE 18 | 48.3 | 0.7 | 119 | xylene | 2.0 | A | C | C |
| CE 19 | 48.3 | 0.7 | 119 | CLP | 2.0 | A | C | C |
| AE 13 | 48.3 | 0.7 | 119 | L-5340 | 0.5 | A | A | A |
| CE 20 | 49.5 | 0.7 | 109 | — | — | — | C | C |
| AE 14 | 49.5 | 0.7 | 109 | L-5340 | 0.5 | A | A | A |
| CE 21 | 54.1 | 0.7 | 78 | — | — | — | C | C |
| AE 15 | 54.1 | 0.7 | 78 | L-5340 | 0.5 | A | A | A |
| CE 22 | 57.0 | 0.7 | 65 | — | — | — | C | C |
| AE 16 | 57.0 | 0.7 | 65 | L-5340 | 0.5 | A | A | A |
| CE 23 | 59.8 | 0.7 | 55 | — | — | — | A | A |
| AE 17 | 59.8 | 0.7 | 55 | L-5340 | 0.5 | A | A | B |

TABLE 3

| NO. | Polyisocyante MDI (wt %) | Dimer (wt %) | Visco. (cps) | Additive Grade | Amount (pbw) | Solubility Test | Storage Stability 2W | 4W |
|---|---|---|---|---|---|---|---|---|
| CE 24 | 62.7 | 0.7 | 47 | — | — | — | C | C |
| CE 25 | 62.7 | 0.7 | 47 | L-5340 | 0.5 | A | B | C |
| CE 26 | 65.6 | 0.7 | 41 | — | — | — | C | C |
| CE 27 | 65.6 | 0.7 | 41 | L-5340 | 0.5 | A | B | C |
| CE 28 | 40.4 | 0.9 | 202 | — | — | — | B | C |
| AE 18 | 40.4 | 0.9 | 202 | L-5340 | 0.5 | A | A | A |
| CE 29 | 43.2 | 1.2 | 161 | — | — | — | C | C |
| AE 19 | 43.2 | 1.2 | 161 | L-5340 | 0.5 | A | A | A |
| CE 30 | 65.6 | 0.7 | 41 | — | — | — | C | C |
| CE 31 | 65.6 | 0.7 | 41 | L-720 | 0.5 | A | C | C |
| CE 32 | 40.4 | 0.9 | 202 | — | — | A | B | C |
| AE 21 | 40.4 | 0.9 | 202 | L-720 | 0.5 | A | A | A |
| CE 33 | 43.2 | 1.2 | 161 | — | — | — | C | C |
| AE 22 | 43.2 | 1.2 | 161 | L-720 | 0.5 | A | A | A |

TABLE 4

| AE NO. | Denatured silicon oil Grade | Amount (pbw) | Solubility Test | Storage Stability 2W | 4W |
|---|---|---|---|---|---|
| 23 | | 0.0005 | A | A | A |
| 24 | | 0.001 | A | A | A |

TABLE 4-continued

| AE NO. | Denatured silicon oil Grade | Amount (pbw) | Solubility Test | Storage Stability 2W | 4W |
|---|---|---|---|---|---|
| 25 |  | 0.005 | A | A | A |
| 26 |  | 0.01 | A | A | A |
| 27 | L-720 | 0.05 | A | A | A |
| 28 |  | 0.1 | A | A | A |
| 29 |  | 0.5 | A | A | A |
| 30 |  | 1.0 | A | A | A |
| 31 |  | 3.0 | A | A | A |
| 32 |  | 0.0005 | A | A | A |
| 33 |  | 0.001 | A | A | A |
| 34 |  | 0.005 | A | A | A |
| 35 |  | 0.01 | A | A | A |
| 36 | KF-352 | 0.05 | A | A | A |
| 37 |  | 0.1 | A | A | A |
| 38 |  | 0.5 | A | A | A |
| 39 |  | 1.0 | A | A | A |
| 40 |  | 3.0 | A | A | A |
| 41 |  | 0.0005 | A | A | A |
| 42 |  | 0.001 | A | A | A |
| 43 | L7602* | 0.005 | A | A | A |
| 44 |  | 0.01 | A | A | A |
| 45 |  | 0.05 | B | B | B |

*Polyether-type (produced by Nihon Unica)

TABLE 5

| AE NO. | Denatured silicon oil Grade | Amount (pbw) | Solubility Test | Storage Stability 2W | 4W |
|---|---|---|---|---|---|
| 46 |  | 0.0005 | A | A | A |
| 47 | KF-945 | 0.001 | A | A | A |
| 48 |  | 0.005 | B | B | B |
| 49 |  | 0.01 | B | B | B |
| 50 |  | 0.001 | A | A | A |
| 51 |  | 0.005 | A | A | A |
| 53 |  | 0.01 | A | A | A |
| 54 | L-5340 | 0.05 | A | A | A |
| 55 |  | 0.1 | A | A | A |
| 56 |  | 1.0 | A | A | A |
| 57 |  | 2.0 | A | A | A |
| 58 |  | 3.0 | A | A | A |
| 59 |  | 0.001 | A | A | A |
| 60 |  | 0.005 | A | A | A |
| 61 |  | 0.01 | A | A | A |
| 62 | SH-190* | 0.05 | A | A | A |
| 63 |  | 0.5 | A | A | A |
| 64 |  | 1.0 | A | A | A |
| 65 |  | 2.0 | A | A | A |
| 66 |  | 3.0 | A | A | A |

*Silicon-based surfactant (produced by Nihon Unica)

TABLE 6

| AE NO. | Denatured silicon oil Grade | Solubility Test | Storage Stability 2 W | 4 W |
|---|---|---|---|---|
| 67 | KF-353 | B | B | B |
| 68 | KF-410 | A | A | A |
| 69 | KF-412 | A | A | A |
| 70 | KF-910 | A | A | A |
| 71 | KF-851 | B | B | B |
| 72 | X-22-819 | B | B | B |

What is claimed is:

1. A polyisocyanate composition which contains 0.0001 to 4 parts by weight of denatured silicon oil being inactive to polyisocyanate compound, based on 100 parts by weight of the polyisocyanate compound comprising diphenylmethane diisocyanate oligomer containing 40 to 62 wt % diphenylmethane diisocyanate and/or its derivatives.

2. The polyisocyanate composition of claim 1 wherein the denatured silicon oil is a polyether-type denatured silicon oil.

3. The polyisocyanate composition of claim 2 wherein the polyether-type denatured silicon oil is polysiloxane-polyoxyalkyleneoxide copolymer.

4. The polyisocyanate composition of claim 1 wherein the content of the denatured silicon oil is from 0.0005 to 3 parts by weight based on 100 parts by weight of the polyisocyanate compound.

5. The polyisocyanate composition of claim 1 wherein the diphenylmethane diisocyanate oligomer contains diphenylmethane diisocyanate of from 44 to 55 wt %.

6. The polyisocyanate composition of claim 1 wherein the viscosity at 25° C. of the polyisocyanate compound is from 55 to 140 cps.

* * * * *